United States Patent [19]
Cutter

[11] Patent Number: 5,488,695
[45] Date of Patent: Jan. 30, 1996

[54] VIDEO PERIPHERAL BOARD IN EXPANSION SLOT INDEPENDENTLY EXERCISING AS BUS MASTER CONTROL OVER SYSTEM BUS IN ORDER TO RELIEF CONTROL OF HOST COMPUTER

[75] Inventor: Daniel F. Cutter, Boxboro, Mass.

[73] Assignee: Data Translation, Inc., Marlboro, Mass.

[21] Appl. No.: 405,763

[22] Filed: Mar. 16, 1995

Related U.S. Application Data

[63] Continuation of Ser. No. 48,490, Apr. 16, 1993, abandoned.

[51] Int. Cl.⁶ ............................. G06F 13/12; G06F 13/14
[52] U.S. Cl. .................. 395/290; 395/281; 364/230.4; 364/240.5
[58] Field of Search .................................... 395/290, 281

[56] References Cited

U.S. PATENT DOCUMENTS

| | | |
|---|---|---|
| 4,488,218 | 12/1984 | Grimes . |
| 4,583,160 | 4/1986 | Iguma . |
| 4,970,663 | 11/1990 | Bedell et al. . |
| 5,045,940 | 9/1991 | Peters et al. . |
| 5,151,997 | 9/1992 | Bailey et al. ........................ 395/800 |
| 5,170,252 | 12/1992 | Gear et al. ........................ 358/181 |
| 5,185,881 | 2/1993 | Brooks et al. ........................ 395/575 |
| 5,241,631 | 8/1993 | Smith et al. . |
| 5,241,663 | 8/1993 | Rohwer . |
| 5,257,350 | 10/1993 | Howard et al. ...................... 395/162 |
| 5,274,738 | 12/1993 | Daly et al. .............................. 395/2 |
| 5,287,460 | 2/1994 | Olsen et al. . |
| 5,305,436 | 4/1994 | Mundkur ................................ 395/162 |
| 5,309,568 | 5/1994 | Ghosh et al. . |

FOREIGN PATENT DOCUMENTS

93/12481 6/1993 WIPO .

OTHER PUBLICATIONS

News Release entitled "Media 100™—Industry's First Online, Nonlinear Video Production System Introduced by Data Translation's Multimedia Group" dated Jan. 11, 1992.
"Multimedia Group Strategy and Media 100™ Backgrounder" dated Feb. 1992.
"Announcing a totally new concept in the field of video post production" distributed Jan. 1992.

*Primary Examiner*—Krisna Lim
*Attorney, Agent, or Firm*—Fish & Richardson

[57] ABSTRACT

A video peripheral board for providing video I/O capabilities to a general purpose host computer. The video peripheral board comprises a video I/O port configured to connect a video device, a bus interface circuit, and a processor. The bus interface circuit is configured to connect the video peripheral board into a system bus of the host computer, and is capable of becoming bus master of the system bus. The bus interface circuit includes a bus master address generator, a data buffer and bus control logic that provides and receives bus control signals to and from the system bus to effect read and write operations over the system bus independent of the central processing unit of the host computer. The processor controls the bus interface circuit and the video I/O port to effect transfer of video data between the video I/O port and storage of the host computer, the video data passing through the video I/O port in real time.

25 Claims, 7 Drawing Sheets

```
enum Packet_Type {
    ...
    PT_VideoFrameRequest,
    PT_AudioFrameRequest,
    PT_VideoFrameDiscard,
    PT_AudioFrameDiscard,
    PT_PlaySetup,
    PT_StopPlay
    ...
};

enum Subsample_Mode_t
{
    k_Off,             // stop at end of frame
    k_Halt,            // halt subsampling immediately
    k_One_Frame,       // subsample only one frame, then halt
    k_Half_Speed,      // NTSC = 15      PAL = 12.5   frames/sec
    k_Full_Speed       // NTSC = 29.97   PAL = 25     frames/sec
};

struct message_packet {
    unsigned char       length;     // packet length in 32-bit words
    Socket_Number       src;        // source socket number
    Socket_Number       dst;        // destination socket number
    enum Packet_Type    type : 8;   // discriminant for the union
    long                seqNum;     // Sequence number
    union {
        struct frame_request {
            long            frame;     // frame requested -- timestamp
        };
        struct frame_descriptor {
            long            frame;     // frame ID
            long            address;   // buffer's address in host RAM
            short           fOCount;   // size of frame
        };
        struct packet_window_location {
            long            *address;    // address of top left pixel
            long            row_bytes;   // offset of bytes between rows
            enum Subsample_Mode_t mode : 16;
            short           height;      // nr of rows in subsample image
            short           width;       // nr of pixels in each subsample
line
        };

... other variants of the message packet

During input:

VIDEO PERIPHERAL BOARD IN EXPANSION SLOT INDEPENDENTLY EXERCISING AS BUS MASTER CONTROL OVER SYSTEM BUS IN ORDER TO RELIEF CONTROL OF HOST COMPUTER

This is a continuation of application Ser. No. 08/048,490, filed Apr. 16, 1993, now abandoned.

CROSS REFERENCE TO RELATED APPLICATIONS

U.S. patent application Ser. No. 08/451,655, filed on May 30, 1995, entitled "DISPLAYING A SUB-SAMPLED VIDEO IMAGE ON A COMPUTER DISPLAY" which is a continuation of the U.S. patent application Ser. No. 08/049,100 filed on Apr. 16, 1993, now abandoned;

U.S. patent application Ser. No. 08/454,428, filed on May 30, 1995, entitled "ADAPTIVE VIDEO COMPRESSION USING VARIABLE QUANTIZATION" which is a continuation of the U.S. patent application Ser. No. 08/048,458 filed on Apr. 16, 1993, now abandoned;

U.S. patent application Ser. No. 08/048,782, filed on Apr. 16, 1993, entitled "ADAPTIVE VIDEO COMPRESSION FOR USE IN A PERSONAL COMPUTER"; and U.S. patent application Ser. No. 08/049,987, filed on Apr. 16, 1993, entitled "SYNCHRONIZING DIGITAL AUDIO TO DIGITAL VIDEO," filed herewith, are incorporated herein by reference.

BACKGROUND OF THE INVENTION

The invention relates to microcomputer-based video processing, and more particularly to apparatus for transferring video data among the devices of a microcomputer.

As the costs of high-resolution color computer displays and processing power come down, one of the emerging applications for microcomputers is video post production—displaying and editing video images using the display of the computer as the monitor during the editing process. In a computer video editing system, a video source, typically a video tape recorder, is read and stored in digital form on the disk of a computer. The video may be played back, edited, and written back to a video device.

Because a tape deck requires at least a few tenths of a second to stop or start the movement of the tape, a computer must read or write video data from/to the tape as the tape passes the tape head; that is, the computer must process the video data in real time. During the tape-to-disk, editing, and disk-to-tape processes, merely copying the video and audio data in real time presents a large computational demand, easily seen in the sheer data volume of a video program—30 frames per second, over 300,000 pixels per frame, and several bits per pixel. In addition to performing the data copying operations, the microcomputer must assert overall system management and interact with the user. As the demand of the data streams approaches the highest speed the micro-computer can effectively manage, data integrity is jeopardized. If any intermediate storage area on the path from the video device from/to the host computer's mass storage overflows, data will be lost. This loss can be hard to repair.

In known video editing systems, the CPU of the host computer had responsibility for copying data from device to device, keeping the video monitor updated, and concurrently executing user commands and supervising other system activities. Historically, the host CPU has controlled the flow of data through the computer, including all real-time aspects. Known video peripheral cards have assumed some control over data movement, but the host CPU has still been responsible for fairly fine-grain, real-time control. The data management requirements fluctuate as the amount of data fluctuates, for instance as video frames vary in their compressibility.

SUMMARY OF THE INVENTION

The invention provides techniques and apparatus for implementing real-time video data input by allocating time-critical data handling tasks to a customized peripheral. The host microcomputer, while asserting overall supervision of system behavior, does not need to respond in real time to data copy requests. The invention enables reliable data transfer from/to the video device to/from the host's mass storage.

In general, in a first aspect the invention features a video peripheral board for providing video I/O capabilities to a general purpose host computer. The video peripheral board includes a video I/O port configured to connect a video device, a bus interface circuit, and control logic. The bus interface circuit is configured to connect the video peripheral board into a system bus of the host computer, and is capable of becoming bus master of the system bus. The control logic is configured to control the bus interface circuit to effect transfer of video data between the video I/O port and storage of the host computer, the video data passing through the video I/O port in real time.

Preferred embodiments of the invention may include the following features. The control logic accepts control commands from the host computer to start or stop the data movement or messages specifying addresses at which the data are to be stored, and the peripheral continues the data movement without requiring further control from the host CPU. The storage is RAM of the host computer. The video peripheral board has an audio I/O port. The control logic is a microprocessor. The host computer is programmed to manage the transfer of the video data between the RAM and a mass storage device. The video peripheral board includes logic to block the video data into blocks for transfer over the system bus.

In a second aspect, the invention features a peripheral board providing input/output (I/O) capabilities to a general purpose host computer. The peripheral includes one or more I/O ports, a bus interface circuit, two or more data paths through the peripheral board, and control logic configured to control the bus interface circuit and the data paths to effect real time transfers of data over the paths, and to schedule completion of a transfer over a higher-priority one of the paths in preference to a transfer over a lower-priority one of the paths.

Preferred embodiments may include the following features. The scheduling is priority based to maintain integrity of high-priority paths. The lower-priority path includes a subsampler, and the higher-priority path connects the host computer to a video device at one of the I/O ports, possibly with a CODEC on the path. The control logic is configured to halt the subsample path in order to maintain the integrity of the real time transfer of data on the higher-priority path. The paths may include buffer FIFOs. The peripheral board has logic to block the data into blocks for transfer over the system bus. The control logic is a microprocessor.

In a third aspect, the invention features a peripheral board for providing input capabilities to a general purpose host computer. The peripheral board features an input port receiving sequentially-ordered data, a bus interface circuit, and control logic configured to receive from the host computer the address of a buffer in host's storage, and to specify particular addresses in the buffer so as to reorganize the data into the buffer in a different organization than the sequential organization in which the data are received at the input port, and to control the bus interface circuit to effect real time transfer of data from the input port to the buffer at the particular addresses.

Preferred embodiments of the invention may incorporate the following features. The reorganizing performed by the control logic includes storing the data in the buffer interspersed with control information related to the data. The received data are logically organized into variable length records, and the control logic stores the records into the storage while leaving a gap for a header for each record. The specified addresses are generated in other than sequentially increasing order.

In a fourth aspect, the invention provides a peripheral board for providing output capabilities to a general purpose host computer. The peripheral board includes an output port, a bus interface circuit, and control logic. The control logic controls the bus interface circuit to effect real time transfer of data from the storage to the peripheral board through the bus interface circuit. The control logic also demultiplexes the data transferred to the peripheral board into a portion to control the peripheral board and a portion to output on the output port.

The invention provides the following advantages. The host computer is relieved of any low-latency real-time control responsibilities. The peripheral assumes responsibility for determining the address in RAM to/from which to transfer data, and for formatting the data, off-loading these tasks from the host. The peripheral handles data asynchronously, dynamically, and adaptably. The peripheral can adjust its method of processing input data according to the volume of that input. The input may be variable size; the peripheral is programmed to properly direct that data without requiring the host CPU to provide a variable size destination. The peripheral can store "out of band" control data intermingled with the actual descriptive data, relieving the host of this formatting chore.

Other advantages and features of the invention will be apparent from the following description of a preferred embodiment thereof and from the claims.

DESCRIPTION OF THE PREFERRED EMBODIMENTS

The preferred embodiment will now be described.

DRAWINGS

FIG. 6 shows the data structure through which the host provides commands to the peripheral.

FIGS. 8A, 8B, 8C and 8D form a flow chart showing the operation of the system.

OVERVIEW

Figure 1:
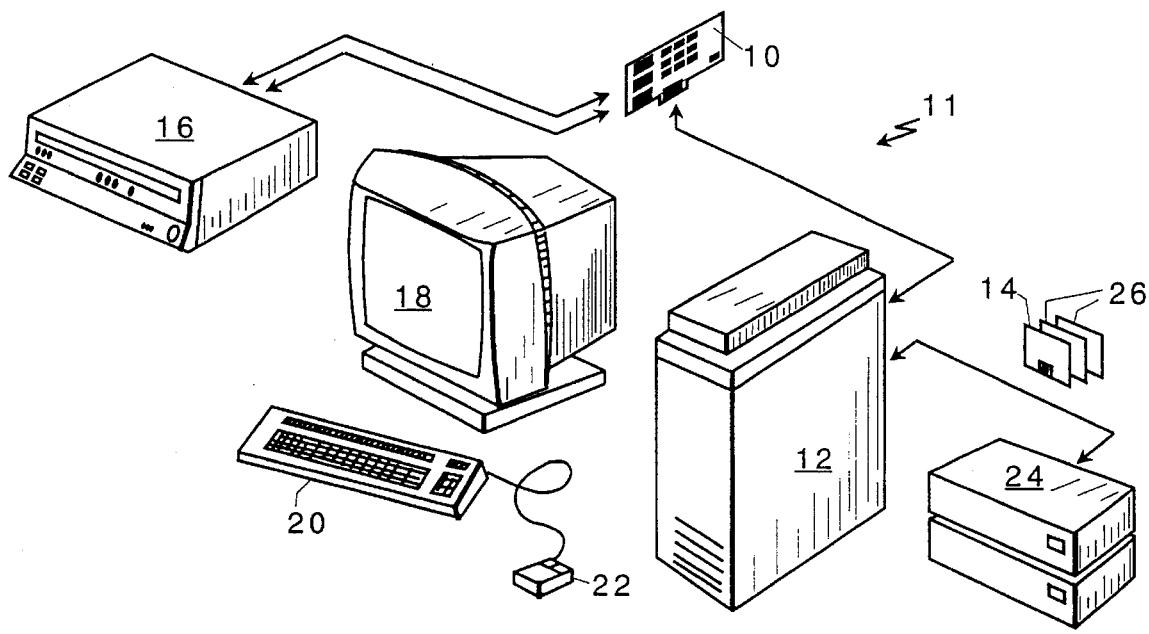
FIG. 1 is a diagrammatic perspective view of components used in a video editing system operating according to the invention.
Figure 2:
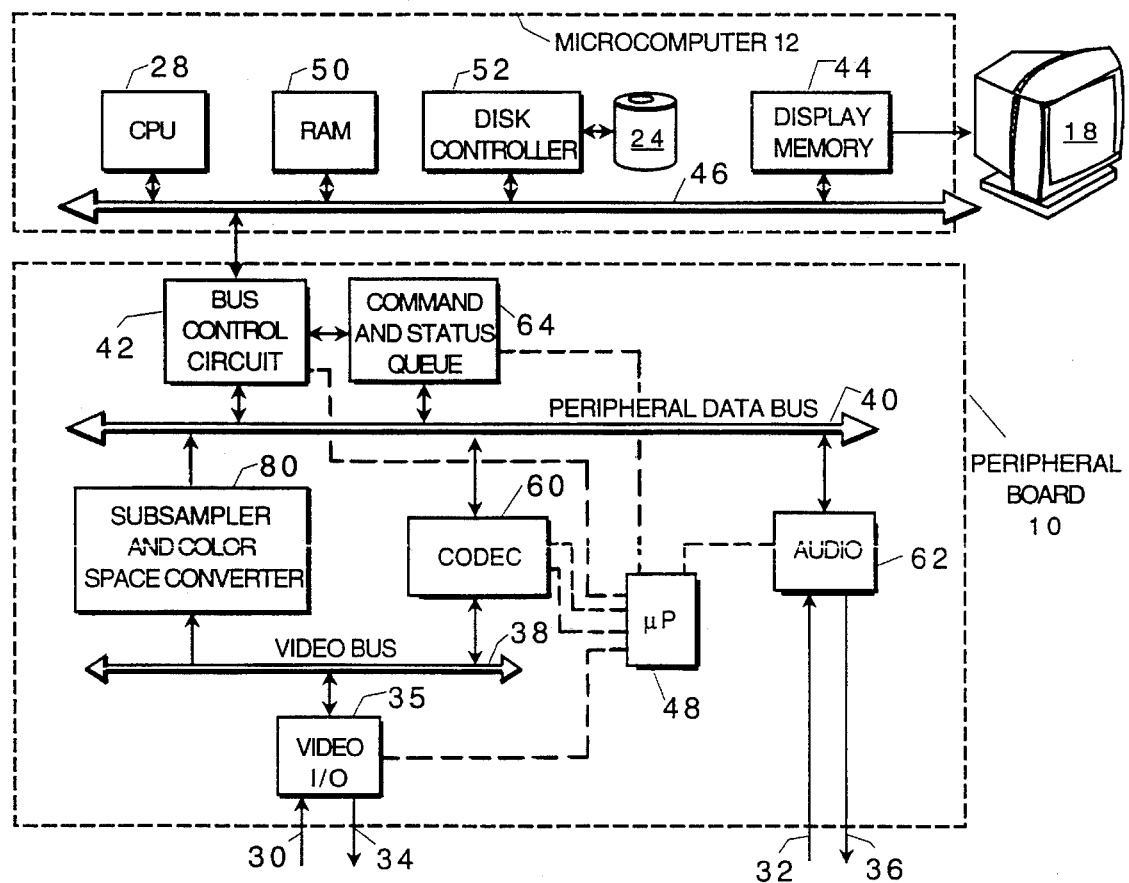
FIG. 2 is a block diagram of a host computer and a video peripheral board used in the system of FIG. 1.

Referring to FIGS. 1 and 2, video editing system 11 includes peripheral board 10 that plugs into host computer 12. Other components include video tape recorder (VTR) 16, monitor 18, keyboard 20, mouse 22, and mass storage disk 24. The software providing video editing functionality is divided into two portions, one portion 26 that executes on the host computer's central processing unit (CPU) 28, generally providing a user interface and supervision, and one portion 14 that executes on the peripheral board, generally controlling the peripheral board, data transfer within the peripheral board, and data transfer between the host computer and the peripheral.

In video editing system 11, video is read through video input port 30, and audio is read through audio input port 32. As the data are read, the video is digitized and compressed, and the audio is digitized. The video and audio are stored on the disk 24. The compressed video/audio data may be decompressed and played back onto display 18 and speakers (not shown). Video editing software 26 allows a user to assemble portions of the compressed video and audio into a video/audio program. As the user edits the program, he can play it and rearrange it in small increments, as small as a single frame, or in assembled combination. Once the user is satisfied with the resulting program, it can be output at full frame rates through video output port 34 and audio output port 36 to a video capture device, e.g. VTR 16, or to a broadcast device.

Referring to FIG. 2, the peripheral board has video and audio ports 30–36 (to connect the VTR or other video device), bus control circuit 42 (to interface with host computer 12), various signal processing paths, and supervisory microprocessor 48. The paths include a two-way path through a compression/decompression coder/decoder (CODEC) 60 to transfer digitized video to or from host computer disk 24, and a one-way color-space conversion (CSC) and subsample path to display digitized video on host computer display 18. Video I/O port circuit 30 converts the video data from the VTR's analog form, e.g. NTSC or PAL, to a digital form, e.g., YUV 4:2:2 format, and puts the digital video on video bus 38. (Video bus 38 can also be written by CODEC 60 during video decompression.) A microprocessor 48 controls the components of the peripheral board.

Tracing the path of a video signal from video bus 38 to the display screen on the subsample path, the YUV data are read from video bus 38, converted to the format required by the display system and subsampled to fit the subsample window of the display at subsampler/CSC 80, and written onto peripheral data bus 40. Bus control circuit 42 writes data to the display memory (also called a "frame buffer") 44 of host computer 12 through system bus 46 of host computer 12. The display system displays the data written into display memory 44. Microprocessor 48 controls the components of the peripheral board.

During recording, CODEC 60 takes the YUV format video from video bus 38, compresses it into a compressed form, writes it to peripheral data bus 40. Bus control circuit 42 takes the compressed video from peripheral data bus 40 and stores it into buffers in the host's RAM 50. Host CPU 28 periodically flushes the buffers to disk 24.

During playback, the process is reversed: host CPU 28 reads the compressed video data from disk 24 into buffers in RAM 24. Bus control circuit 42 copies the data from the buffers to CODEC 60, which decompresses the data, and outputs them to video data bus 38. From there, the decompressed video data can be displayed to the host's display 18 through the subsample path, and/or output through video output port 34.

Simultaneously, up to four channels of audio are transferred from/to the VTR (or other audio source) to/from the peripheral's data bus 46 through an audio controller 62 and an audio I/O port 32,36.

Figure 3:
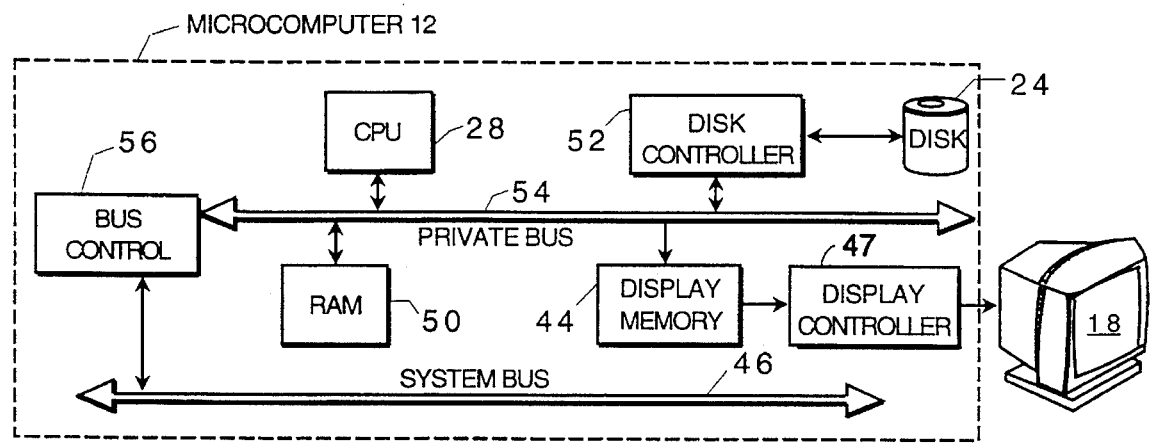
FIG. 3 is a block diagram of an alternate organization of the host computer.

In an alternate organization of the host computer shown in FIG. 3, host computer's CPU 28, display memory (also called a "frame buffer") 44, main memory 50, and/or disk control 52 components may transfer data through a bus 54 private to host computer 12, with bus interface 56 between the private bus 54 and system bus 46. Display memory 44 is connected to display 18 vis display controller 47. In this case, the peripheral's bus control circuit 42 transfers data to/from the system bus 46, and the host's bus interface 56 further directs the data to/from the devices on the host computer's private bus 54.

In any video signal, there is a vertical blanking period to reset the retrace from the bottom of the screen to the top of the screen. During the vertical blanking period, the electron beam is stopped so that it will not overwrite the previous field. During the vertical blanking period, there occurs a synchronization pulse called the "vertical synch" pulse. In interlaced formats, there are two vertical blanking periods per frame, and thus two vertical synch pulses, one at the end of each field. The two vertical synch pulses can be distinguished by their timing relationships to the actual image data of the two fields of a frame.

Many bus protocols allow multiple bus masters. The bus master is the device that currently "owns" the bus, the single device that may initiate a read or write transaction on the bus. Other devices may negotiate the bus away from the current bus master. In some bus protocols, the other device is only allowed to be bus master for a limited time before it is required to cede the bus back to the primary bus master. In other protocols, the new bus master continues to own the bus until another device in turn negotiates the bus away.

Bus control circuit 42 can become bus master of system bus 40 and, if present, private bus 54, so that peripheral 10 can interact directly with host RAM 50 (or display memory 44) without involving host CPU 28. This allows peripheral 10 and host CPU 28 to time-share access to RAM 50: for instance, while peripheral 10 is transferring data to/from RAM 50, the host CPU 28 can operate in parallel out of its registers and cache. The only support required from the host is to manage the data transfer between RAM 50 and disk 24.

The two resources that peripheral 10 tries to conserve are cycles on the host computer's CPU 28 and bandwidth on buses 46 and 54. The peripheral accomplishes this by performing data translations, e.g., compression coding, decompression decoding and color space conversion, and data movement functions. The peripheral is under the general management of host CPU 28, but the host CPU is not required to exert direct word-by-word supervision of the peripheral.

Two levels of timing control are required to accomplish these synchronized actions. The first level is implemented in software 26 in host CPU 28 and software 14 the peripheral's microprocessor 48. The second level of timing control is performed in the hardware to enable the video data coming from/to the compression circuitry to be developed/used at a different rate than the peripheral bus requires for data transmittal.

Structure

Figure 4:
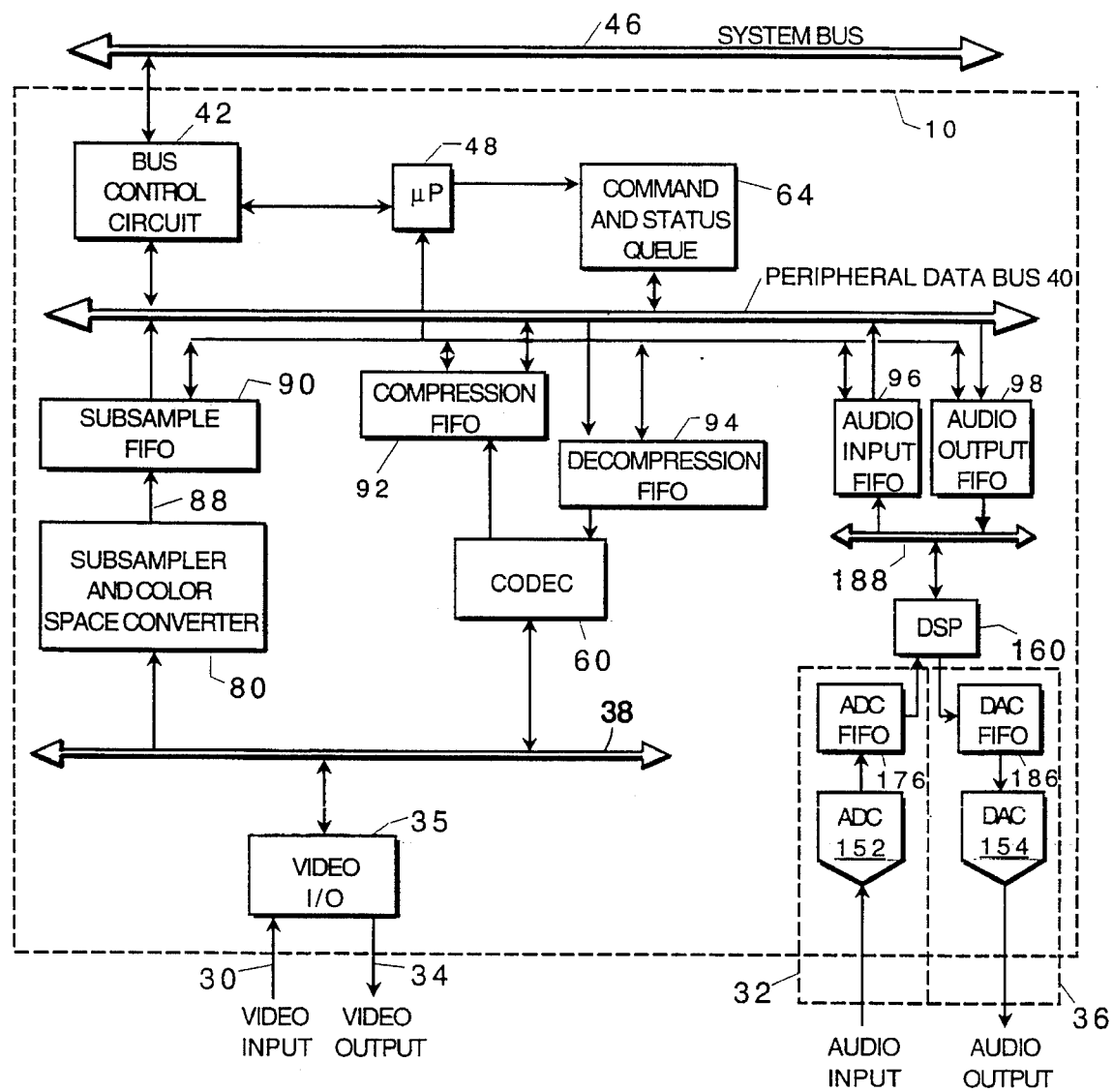
FIG. 4 is a block diagram detailing some of the features of the video peripheral board of FIG. 2.

FIG. 4 shows the primary data paths through peripheral board 10 in more detail. Video data bus 38 carries video data generated by any of several components, e.g., video input port 30 or the decoder portion of CODEC 60. Data bus 40 carries subsampled video from the subsample path or coded video to/from the CODEC path. Bus control circuit 42 transfers data to/from peripheral data bus 40 from/to host RAM 50 or display memory 44. (Either the organization of FIG. 2, in which the host is configured with RAM and display memory connected to the system bus, or the organization of FIG. 3 where the host has a private bus, is applicable.)

CODEC 60 is implemented as a three chip set from LSI Logic, the L64765QC-30 CSRBC, the L64735QC-35 DCT processor, and the L64745QC-30 JPEG coder. Subsampler and color space converter 80 is implemented in the CL-PX0070 Video Window Generator from Pixel Semiconductor, providing conversion from a variety of standard digital video input formats to a variety of RGB encoding outputs; the RGB format chosen will match that required by display system 18 of the host computer.

Video data bus 38, color space converter and subsampler 80, and CODEC 60 are constrained to operate at the rate of the video I/O system. But host computer 12, with its responsibility for servicing interrupts from various peripherals and user programs, cannot provide real-time service. FIFOs (first-in first-out queueing store) 90, 92, 94 decouple the real-time operation and requirements of synchronous video data bus 38 from the inherently asynchronous operation of host computer 12 and peripheral data bus 40.

On the subsample path, the color space converted, subsampled pixel values 88 are buffered in a subsample FIFO 90. Bus control circuit 42 reads the subsampled video out of FIFO 90 and bundles the pixel values into blocks that can be efficiently transferred to the display memory 44 via the system bus 46. The subsample FIFO 90 uses 25 ns parts, is 32 bits wide and 16K words deep, with each entry encoding the RGB value of one pixel.

Compression FIFO 92 and decompression FIFO 94 connect CODEC 60 to peripheral data bus 40. Compression FIFO 92 and decompression FIFO 94 are each 32 bits wide, 16K words deep, and use 25 ns parts.

In the preferred embodiment, microprocessor 48 controlling the peripheral board is a Motorola MC68030. A relatively fast microprocessor is chosen to satisfy the latency demands for real-time service. The components of peripheral board 10 under the control of microprocessor 48 include bus control circuit 42, subsampler and color space converter 80, and CODEC 60. The control is effected by monitoring subsample FIFO 90, compression and decompression FIFOs 92,94, FIFOs in the audio path, and messages from the host CPU.

Microprocessor 48 schedules the data transfers within the peripheral board and between the peripherals FIFOs and the host computer's RAM. The scheduler's first priority is to maintain the integrity of the data flow from video/audio input ports 30, 32 to the host's disk 24 or from disk to video/audio output port 34, 36. The remaining data movement operations, for instance updating the subsample window, are scheduled around this primary flow.

Microprocessor 48 monitors the fill levels of FIFOs 90, 92, 94, 96, and 98, and accepts commands and messages from host CPU 28. Each FIFO can indicate four fill levels: empty, at least one entry full, over a programmable "critical" level, and overflow. The commands from host CPU 28 are supervisory in nature, for instance "begin subsampling, " "stop compressing, " etc. The messages indicate locations of buffers in the host's RAM 50, or that the buffer is full and ready to be copied to peripheral board 10. Microprocessor 48 directs bus control circuit 42, and gives status information back to host CPU 28. The commands to bus control circuit 42 may specify a transfer from/to a given address in host's RAM 50 to/from a specific FIFO, or from one of peripheral board 10's control registers to an address in host's RAM 50. Microprocessor 48 interrupts the host CPU 28 to tell it that an input buffer is full and can be flushed to disk, or that a FIFO has overflowed.

Host CPU 28 and peripheral board 10 communicate via the peripheral's command and status queue 64. The command and status queue is a bidirectional FIFO, analogous to a multi-lane highway with a median strip between separating the messages sent in one direction from those sent in the other. The queue occupies a single address on the system bus; to write a multi-word message to the peripheral, the host writes each word to the address of the address in turn. Microprocessor 48 drains these messages from the command queue 64 and acts on each in turn. When microprocessor 48 sends a message from the peripheral to the host, it interrupts the host to tell it that there is a message waiting in command and status queue 64. The use of these data structures and messages will be discussed below, in connection with the subsample and playback operations.

Figure 5:
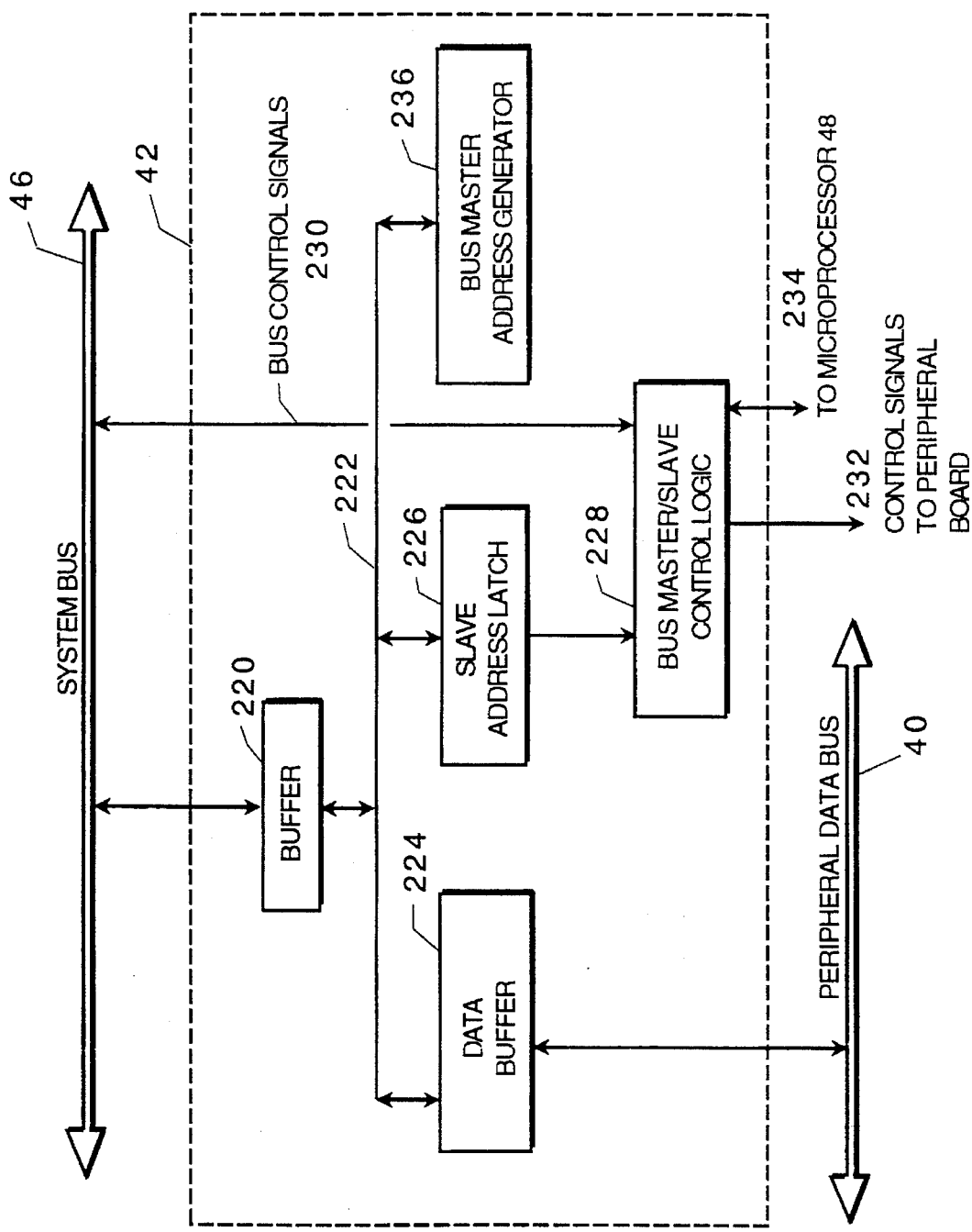
FIG. 5 is a block diagram of the bus control circuit of FIG. 2.

Referring to FIG. 5, bus control circuit 42 interfaces system bus 46 to peripheral board 10. Buffer 220 buffers the bus data and address lines of system bus 46. Data buffer 224 buffers data to be sent to and received from system bus 46, and slave address latch 226 latches the addresses. Peripheral board 10 may act as bus master; when in this mode, bus master address generator 236 (in conjunction with microprocessor 48) generates the addresses for these bus transactions. Bus master/slave control logic 228 generates and receives bus control signals 230 to/from the bus and passes the signals 232, 234 from/to microprocessor 48 and other components of the peripheral board.

Microprocessor 48 specifies relatively large data transfers to the bus control circuit, and bus control circuit 42 breaks the large request into small blocks. This blocking improves efficiency relative to transferring data one 32-bit word at a time, and also prevents any one transfer from tying up the bus for an unacceptably long time. The gap between blocks allows higher priority operations, for instance CODEC copy operations, audio channel copy operations, or dynamic RAM refresh cycles, to preempt lower-priority ones, for instance the stream of subsampled video data.

The format for the messages to control the subsampler is shown in the C data structures shown in FIG. 6. "enum Subsample_mode_t" is the stop/start command vocabulary with which the host can control the subsampler. The subsampler can be directed to halt at the next frame boundary or immediately. The subsampler can be directed to subsample and display one frame and halt (k_One_Frame), subsample every frame (k_Full_Speed), or subsample every other frame (k_Half_Speed). The half-speed setting causes the Pixel subsampler part to ignore every other frame.

The message packet itself contains a header with a packet length and source and destination addresses. The "type" member discriminates among the variants of the union (the only variant relevant to subsampler operation is shown). The peripheral negates the sequence number when it has processed the packet; this allows the host to correlate reply packets with the packets it issued to the peripheral. The window_location variant of the union specifies the address in the hosts memory for the upper left pixel of the subsample window. Member "row_bytes" tells the address offset between successive scan lines of the display memory. Members "height" and "width" tell the dimensions of the subsample window. The message_packet struct has other members not shown in FIG. 6, for instance those used by the host to manage a pool of message packets in its memory, but these members are not transmitted to the peripheral.

The preferred host computer is an Apple Macintosh, model Quadra 950 or faster.

The video editing session is under the control of software 26 that runs on the CPU of the host computer. This software provides a graphical user interface to the human user for control of the video editing session, and supervises the operation of peripheral board 10. The supervision required of host CPU 28, however, is limited: For instance, for subsampling, CPU 28 provides one message to the peripheral board to begin displaying video in a window at a specified screen position. Future messages may direct the peripheral board to move the video window to a different window of the screen, or to stop the display, but no further messages or computation are required from the Macintosh CPU to simply sustain the video display. For copying data to or from video I/O port 30,34, host CPU 28 only needs to copy data from/to disk 24 to/from RAM 50; the rest of the processing is carried out by peripheral board 10.

Figure 7:
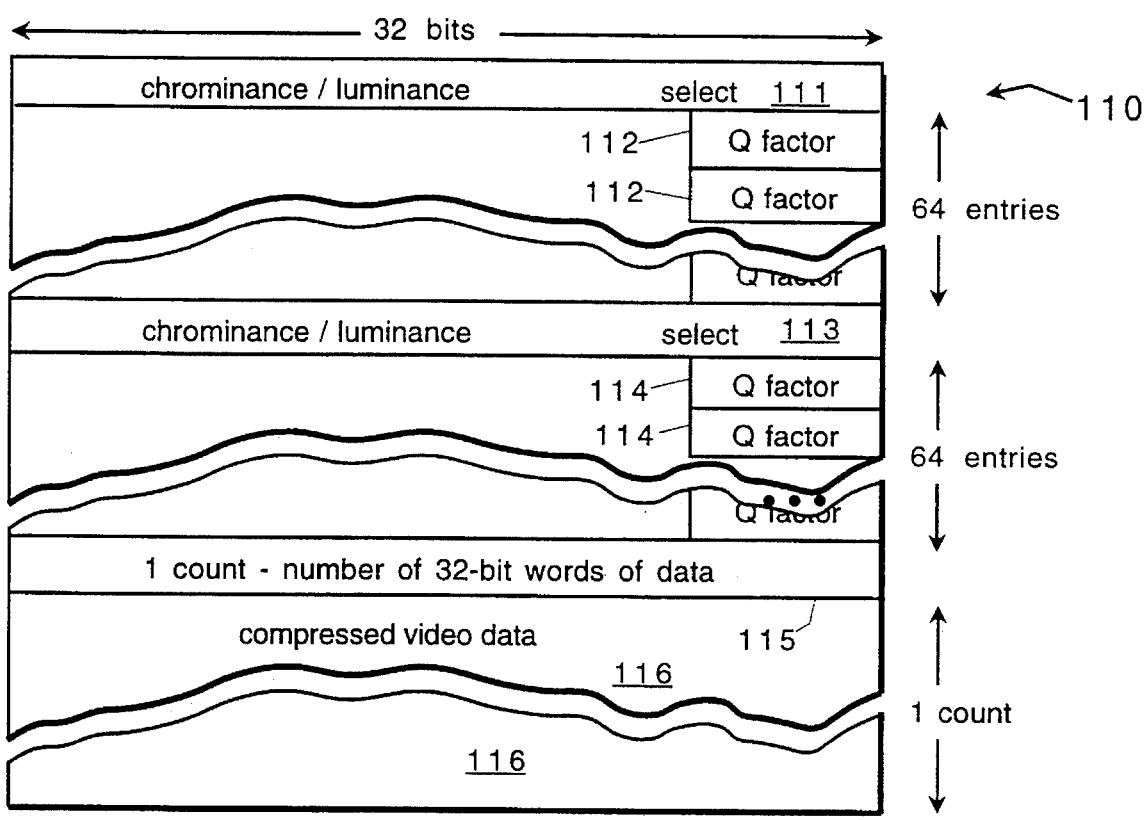
FIG. 7 shows the format for a packet of compressed video data.

FIG. 7 shows data packet format 110 for an encoded video field as it is stored on disk. A full Q-factor set and data count are stored in the 131-word packet header. The Q-factors are stored as 64 chrominance entries and 64 luminance entries 112, 114. Identifier flags 111, 113 identify which 64 entries are chrominance and which are luminance. Each Q-factor is 8 bits, but in the packet, a Q-factor is padded out to 32 bits. A 32-bit count 115 indicates the number of words, 1count, of compressed data to follow, followed by the 1count words of compressed data 116 of the field image. Thus, each video field has its decode key, Q-factor set 112, 114, stored with it. Successive fields may be encoded with identical Q-factors, but the compressed images of the fields will nonetheless be stored with full, identical, Q-factor headers 111–114. This enables Q-factor changes to occur at any field boundary of the compressed video data.

Bus control circuit 42 and microprocessor 48 assume the entire real time burden of transferring the video data from CODEC 60 to buffers in the host's RAM 50. Transfer from the RAM buffer to disk 24 can be completed asynchronously by host CPU 28. The host's only responsibility during compression is to keep a sufficient supply of disk buffers available and empty for the peripheral's use during compression, or available and full during decompression. The host maintains its supply of empty buffers by flushing the full buffers to disk 24.

Operation

Figure 8A:
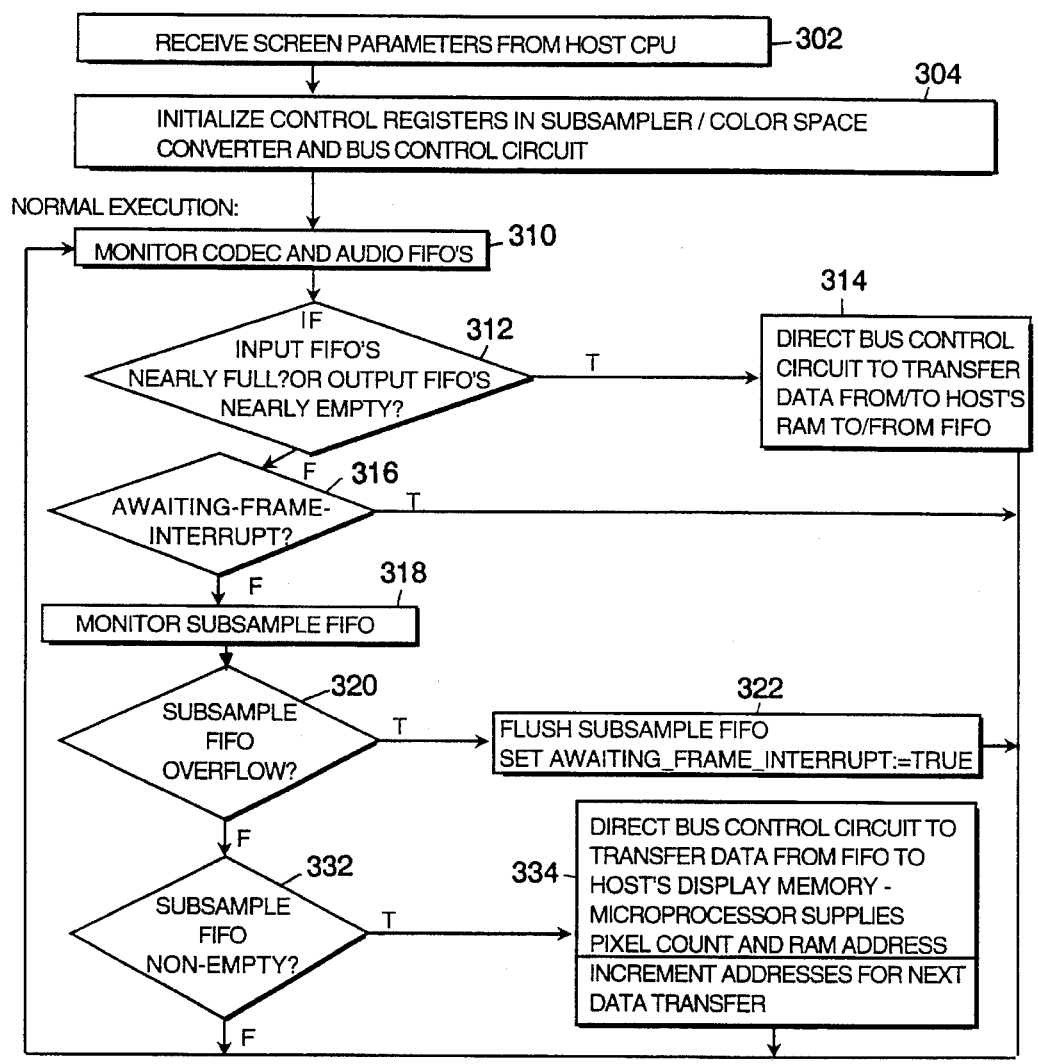
Figure 8B:
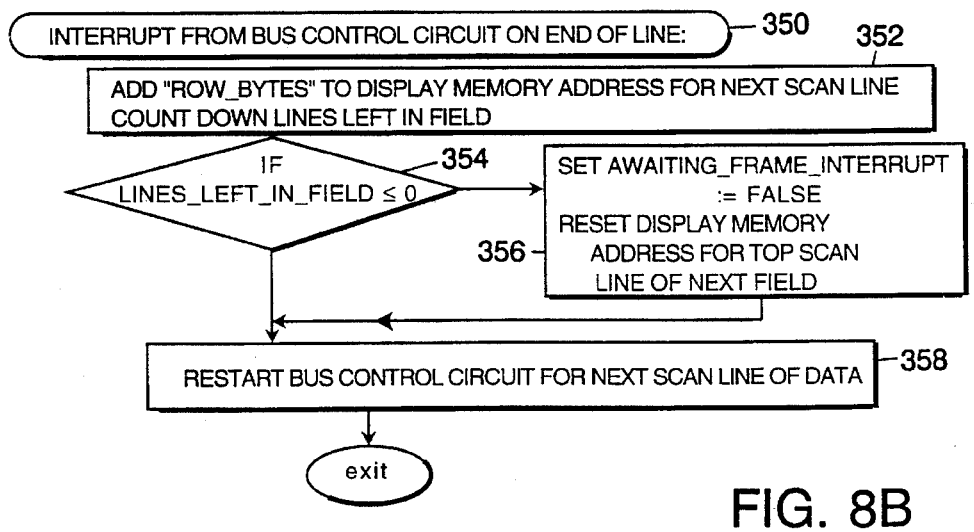

Referring to FIGS. 8A and 8B, the system operates as follows. As the host computer is turned on and executes its bootstrap procedure, it queries the display system to find out whether an external display device resides on the system bus (as shown in FIG. 2), or whether the display is on the host private bus (as shown in FIG. 3), and at what addresses the display memory is mapped. The host also queries each of the peripheral boards in the expansion slots, and establishes memory addresses for each of them.

As part of its power-up routine, peripheral board 10 runs a self-test diagnostic (stored in ROM on peripheral board 10) and then waits for software 14 to be downloaded from host computer 12 to microprocessor 48. When video editing software 26 starts on host computer 12, it takes the host out of virtual memory mode so that peripheral 10 will have access to the address space of host 12. Host software 26 then downloads peripheral software 14 to the peripheral board. The downloaded software 14 institutes hand-shaking within peripheral board 10, and then hand-shaking with host CPU 28. When this start-up routine is completed, the peripheral board sets itself into a default mode wherein image data on the video bus are displayed in the window specified by the host (step 302), and the peripheral is ready to record or playback video or audio through ports 30–36. The initialization also includes initialization of control registers in the subsampler/color space converter and the bus control circuit (step 304).

Once the system is in operation, the subsampling path through the peripheral is essentially always active, transforming whatever video data are on the video data bus into displayable RGB form, subsampling to a reduced size image, and storing the pixel values in display memory 44. Thus, the user can always monitor the incoming or outgoing video data in the subsample window of the host's display. The color space conversion, subsampling, and writing into FIFO 90 continues synchronously, essentially in real time at the rate of the video device. However, because the subsampling path must compete for system resources—for instance system bus 46—with other paths through the peripheral, bus control circuit 42 transfers data from subsample FIFO 90 to display memory 44 asynchronously. The scheduling interactions of the various paths in resolving these contentions is discussed following.

Note that during the data movement process, host computer CPU 28 is not involved, thus freeing CPU 28 for other tasks. The software 26 running on the host CPU offers the user a number of choices. Typically the user will first load source video data from VTR 16 or another source onto disk 24 so that the video can thereafter be edited. After editing has been completed, the compressed video can be copied from the disk to VTR 16. On user command, the host computer may direct the peripheral to stop the subsampling path, either to freeze a frame or to allow the host computer to reclaim the display memory for other purposes. Host CPU 28 and software 26 also perform system supervisory tasks; for instance, the host can detect faults in peripheral board 10, and can in turn reset peripheral board 10 to clear any incomplete or inconsistent state.

When the user asks the system 11 to compress video data, the digitized video data are presented to video bus 38, for instance by VTR 16 and video input port 30, and consumed by CODEC 60. CODEC 60 compresses the video; the compressed data are buffered in compression FIFO 92. From compression FIFO 92, bus control circuit 42 copies the compressed video data and compression parameters into the host computer's RAM 50. Then, the compression parameters and the compressed data are written to disk 24 for storage.

The synchronous part of the encoding path, between the video data bus and compression FIFO 92, is largely clocked by the pixel clock and vertical synch pulse generated by the video I/O port. Once the compressed pixels are stored in compression FIFO 92, the remaining processing may proceed asynchronously, as long as it proceeds quickly enough to prevent compression FIFO 92 from overflowing.

Figure 8C:
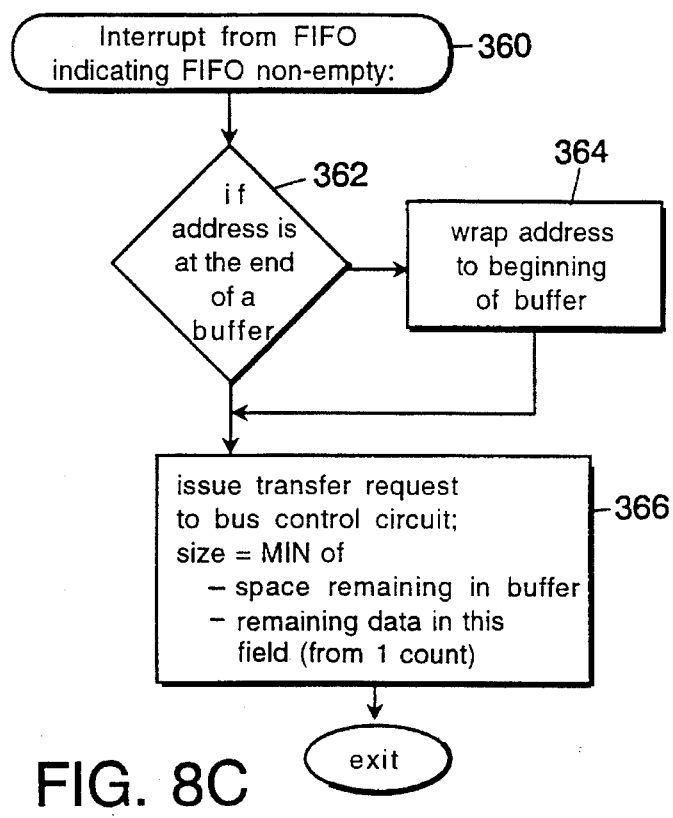
Figure 8D:
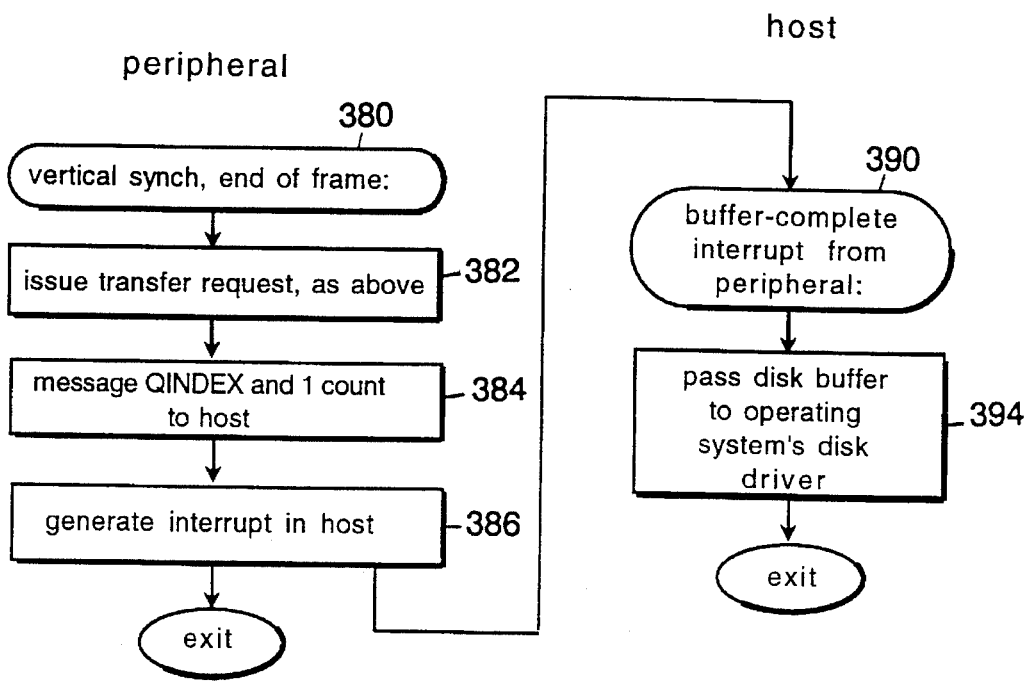

FIGS. 8C and 8D shows the operation of the system during compression coding. The left column shows steps taken by peripheral microprocessor 48, and the right column shows steps taken by the host CPU 28. Referring to FIGS. 4, 5 and 8c, bus control circuit 42, with some assistance from the peripheral's microprocessor 48, transfers the compressed video data from compression FIFO 92 into disk buffers in the host's RAM 50. Bus control circuit 42 drains the data words from compression FIFO 92, and control logic 228 and address generator 236 block the data into 16-word blocks for bus transfer across system bus 46. Microprocessor 48 and address generator 236 account for the variable-length data packets generated by CODEC 60. At the beginning of each field, the address generator leaves 131 words in the disk buffer for header area 111–115 of a data packet. Microprocessor 48 counts the words used in each RAM buffer, and signals host CPU 28 when a buffer is complete and ready to be written to disk 24. Microprocessor 48 then provides the address of the next buffer to address generator 236.

Referring to FIG. 8C, as compressed data begin to flow from CODEC 60 into compression FIFO 92, an interrupt (step 360) is sent from the FIFO to the peripheral's microprocessor 48 to indicate that the FIFO is non-empty. If the current address for the host's RAM is at the end of a buffer (determined in step 362), microprocessor 48 wraps the address to the beginning of a new buffer (step 364). Then, in step 366, microprocessor 48 issues a transfer request to bus control circuit 42 to transfer the minimum of the space remaining in the current buffer or the data remaining in the current field.

The data transfer continues until compression FIFO 92 indicates that it is empty.

When the transfer finally succeeds in draining the FIFO, the peripheral releases the bus (or starts a lower-priority transfer, for instance subsample), and goes to sleep until the compression FIFO becomes non-empty again.

FIG. 8D shows the processing that is initiated when a vertical synch pulse, indicating the end of a frame, occurs on video bus 38. At this time, CODEC 60 begins to generate compressed video data that are stored in compression FIFO 92, and transfer of these data to the host takes high priority, as already mentioned. The vertical synch pulse causes an interrupt to be sent to microprocessor 48 (step 380). In step 382, microprocessor 48 issues a transfer request to the bus control circuit (sized as in step 366).

At the end of each field, microprocessor 48 obtains the count of the number of words of compressed data for the frame, 1count, and parameter values used to encode the field, from CODEC 60. Bus control circuit 42 to messages the 1count value and an index for the set of Q factors, QINDEX, to the host (step 384), which puts the 1count value Q factors into the 131 words of header for the field data packet, and messages host CPU 28 that the buffer is complete and can be flushed to disk 24.

Once the compressed video data (and associated digital audio samples) are stored in the RAM, host CPU 28 schedules them to be flushed to disk. This operation is scheduled so that it stays ahead of the peripheral and maintains a supply of available buffers, but so that the flush stream is never so intense as to crowd the peripheral off the bus.

When a host buffer has been filled, peripheral microprocessor 48 interrupts host CPU 28 (steps 386 and 390), which then writes the contents of the buffer to disk (step 394).

When the user asks for decompression, for instance to play back a clip of previously-compressed video data, host microprocessor 28 and bus control circuit 42 assume the responsibility of keeping decompression FIFO 94 full by requesting data from the host computer's disk 24; this process will be discussed below. The data are sent to CODEC 60 where they are decompressed and presented as digital video on video bus 38.

Referring again to FIG. 6, for each frame it wishes to play back, peripheral microprocessor 28 sends a "PT_VideoFrameRequest" or "PT_AudioFrameRequest" message packet to host requesting the frame by time-stamp ID indicated in member "frame." The peripheral queues up enough of these frame requests so that the host's buffer filling process will stay ahead of the peripheral's buffer draining process. The host translates that message into a request to the Macintosh disk engine. Once the disk engine has put the data into RAM 50, the host CPU 28 sends a "PT_VideoFrameDescriptor" or "PT_AudioFrameDescriptor" packet back to the peripheral via command and status queue 64. This packet indicates the address in the host's RAM 50 at which the data have been read, and the data count. When microprocessor 48 and bus control circuit 42 have drained the data from buffers into decompression FIFO 94 and audio output FIFO 98, the peripheral changes the "type" of the packet to "PT_VideoFrameDiscard" or "PT_AudioFrameDiscard" and sends the packet back to the host through the command and status queue 64, interrupting host 28 to tell it to check the queue. The host puts the discarded storage back in its free pool.

The decompression operation may specify that a single frame (two fields) is to be decompressed, or that decompression is to be continuous until the peripheral board 10 receives a command to halt from the host 28. The single-frame mode is useful for compressing still graphics.

On a halt command, state machine 100 performs an orderly shut down of CODEC 60 by allowing it to complete decompressing any data it is working on, and preventing the loading of the next field's compressed data.

Microprocessor 48 is responsible for prioritizing tasks on the peripheral board. The subsample path is essentially always active displaying the video data on video data bus 38 onto the host's display 18, but in general any data movement through the CODEC path has precedence over the viewing operation: data loss during the tape-to-disk copying operation is effectively irreversible and should be prevented if at all possible. On the other hand, allowing the subsample path to lag the CODEC path—or omitting frames from the video display—is a failure with no lasting impact. The peripheral's microprocessor is responsible for maintaining the integrity of the copy stream by enforcing this priority. Microprocessor 48 controls the rate at which FIFOs 90, 92, 94 are unloaded, up to the saturation rate of system bus 46 of the host computer. Thus, the system can selectively choose the rate at which the video data are sent to the display memory, thereby changing the frame rate of the subsampled video presented on the display. This flow control is effected by the peripheral microprocessor 48: it monitors the fill level of the CODEC's FIFOs 92, 94, FIFOs on the audio path, and subsample FIFO 90, and uses this information to control the peripheral's bus transactions. For instance, if either of CODEC FIFOs 92, 94 are approaching full, microprocessor 48 suspends the bus control circuits' draining the subsample FIFO 90 and gives immediate attention to draining the CODEC FIFOs 92, 94. In practice, the subsample window is updated nearly in real time, with delays limited to two to four frames.

Referring to the central loop shown in FIG. 8A, the peripheral's microprocessor 48 monitors the FIFOs and directs data transfers. Microprocessor 48 allows the FIFOs to fill sufficiently to efficiently transfer data in blocks. In step 310, microprocessor 48 monitors the fill levels of the codec and audio FIFOs 92, 94, 96, 98. If either of the input FIFOs 92, 96 are nearly full, or either of the output FIFOs 94, 98 are nearly empty (step 312), then in step 314 microprocessor 48 directs bus control circuit 42 to transfer data from/to host computer memory 50 to/from the respective FIFO and returns to the FIFO monitoring state (step 310). If the codec and audio FIFOs are not in need of servicing (step 312), then in step 316, processor 48 determines whether a frame interrupt has been received and needs to be processed. If not, the subsample FIFO is monitored (step 318). Assuming that there has not been a subsample FIFO overflow, if the subsample FIFO is non-empty, microprocessor 48 directs bus control circuit 42 to transfer a block of subsample data from the subsample FIFO to the host's display memory (step 334), and then return to step 310. The hierarchy of FIFO monitoring and other operations on FIG. 8A acts prioritize data transfers across the system bus under the control of processor 48. For instance, subsample FIFO 90 will be blocked into blocks of 16 32-bit-wide words for transfer across system bus 46. The gap between blocks allows other operations, for instance CODEC copy operations, audio channel copy operations, or dynamic RAM refresh cycles, to preempt the stream of subsampled video data. The result is that the display stream is completely asynchronous—the display in the subsample window will often be split between showing parts of two frames for a fraction of a second, usually a time too short to be distinguished by the human eye. During times when the CODEC stream is very full, for instance immediately after a scene change from easy-to-compress material to hard-to-compress material (for instance to a new scene with many more sharp edges), bus control circuit 42 suspends unloading subsample FIFO 90 for several frames until the data volume over the copy stream subsides. Subsample FIFO 90 may overflow during this time (as detected at step 320). The peripheral's microprocessor 48 will then flush subsample FIFO 90, wait for the next frame or field boundary by setting a variable "awaiting_frame_interrupt" to indicate that the microprocessor is awaiting the next frame boundary to restart the subsample video stream (step 322). After the next field or frame boundary, microprocessor 48 will then restart the subsample video stream as discussed in connection with FIG. 8B, below.

Microprocessor 48 and bus control circuit 42 cooperate to transfer data between the FIFOs 90, 92, 94 of the peripheral board and the host's RAM 50 efficiently. A first example of cooperation between microprocessor 48 and bus control circuit 46 is the copying of compressed video data from the output of CODEC 60 to host RAM 50. Microprocessor 48 monitors the fill level of compression FIFO 92, the amount of space remaining in ring buffers in host RAM 50, and the amount of data in the CODEC remaining before the end of a field, and issues commands to bus control circuit 42 to transfer a specified number of words of data to/from a FIFO from/to a specific address of host RAM 50. To reduce bus traffic, bus control circuit 42 breaks the request from microprocessor 48 into smaller blocks, typically 16 32-bit words of data per block. For each block, bus control circuit 42 drains data from the subsample FIFO 90 or compression FIFO 92, and writes them over system bus 46 to the proper locations in display memory 44 or host RAM 50.

A second example is the copying and de-interlacing of subsample data from the output of subsampler 80 to display memory 44. (Horizontal scan lines are in interlaced order through the color-space converter, subsampler, and subsample FIFO.) Bus control circuit 42 requests the 32-bit wide data encoding the pixel values one-by-one from subsample FIFO 90 until it has a bus transfer block, typically 16 32-bit words per block, and then transfers the pixel values in a block. At the end of a scan line or the end of a field, bus control circuit 42 interrupts microprocessor 48 (step 350), which in turn performs the address arithmetic to calculate the correct address in the display memory 44 for the next scan line of pixels (as described in steps 352–358). The new scan line's address is calculated so as to de-interlace the fields of a frame by directing each scan line of subsampled data to the correct line in display memory 44. Microprocessor 48 gives this address and the number of pixels in the next scan line to bus control circuit 42. In step 358, microprocessor 48 restarts the subsample display operation of bus control circuit 42.

The schedule on which microprocessor 48 can request bus control circuit 42 to transfer data can vary widely because of varying "density" of the compressed video: some fields will be compressed into a relatively small amount of compressed data, and some relatively large. The bus mastering technique improves both the speed and the reliability with which data are transferred between host computer 12 and peripheral board 10, recognizing the different data rates that must be handled to effect proper data queueing and movement across the system bus 46.

Other embodiments of the invention are within the scope of the claims.

What is claimed is:

1. A video peripheral board having connections for an expansion slot of a general purpose computer for providing video I/O capabilities to said general purpose host computer, said general purpose computer having a system bus, data storage accessed by read and write operations over said system bus, and a central processing unit, said system bus being controllable by said central processing unit (CPU) or by an external device connected to said system bus, the video peripheral board comprising:

a video I/O port connected to a video device;

a bus interface circuit connected to said system bus of the host computer and to said video I/O port, said bus interface circuit including a bus master address generator that generates addresses of said storage for read and write operations over said system bus, a data buffer storing video data for transfer to or from said system bus, and bus control logic that provides and receives bus control signals to and from said system bus to effect read and write operations over said system bus independent of said central processing unit of said general purpose host computer, said bus interface circuit thereby being bus master of said system bus; and a processor connected to control said video I/O port and said bus control logic of said bus interface circuit to effect transfer of video data between said video I/O port and said data buffer land transfer between said data buffer and said storage of the host computer at addresses generated by said bus master address generator, said video data passing through said video I/O port in real time wherein:

the video peripheral board has two or more data paths through the video peripheral board to said bus interface circuit, each said data path having two ends and a priority, at least one said data path being connected between said bus interface circuit and said video I/O port; and said processor is configured to control said bus interface circuit and said data paths to effect real time transfers of data over said data paths, and to schedule completion of a transfer over a higher-priority one of said data paths in preference to a transfer over a lower-priority one of said data paths.

2. The video peripheral board of claim 1 wherein said at least one said data path comprises a compression/decompression coder, and another said data path is a subsample path.

3. The video peripheral board of claim 1 wherein one said data path is an audio path.

4. The peripheral board of claim 1 wherein said scheduling is priority based to maintain integrity of high-priority paths.

5. The peripheral board of claim 4 wherein:

said lower-priority path comprises a subsampler for subsampling video data into the display memory of the host computer;

said higher-priority path connects the host computer to a video device at said video I/O port; and said processor halts said subsample path in order to maintain the integrity of the real time transfer of data on said higher-priority path.

6. The peripheral board of claim 5 wherein said higher-priority path comprises a compression/decompression coder.

7. The peripheral board of claim 1 wherein the video device presents or consumes data at said video I/O port in real time, the peripheral board further comprising a first-in-first-out queuing store (FIFO) to store said data between said bus interface circuit and said video I/O port.

8. The peripheral board of claim 1 wherein said bus control logic blocks the data into blocks for transfer over said system bus.

9. The peripheral board of claim 1 wherein said processor comprises a microprocessor.

10. The peripheral board of claim 1 wherein said processor controls said bus master address generator to specify particular addresses in said storage so as to store said data that had been input into said video I/O port in a sequential organization into said storage in a non-sequential organization.

11. The peripheral board of claim 1 wherein:

said peripheral board includes a demultiplexer connected to said bus interface circuit to demultiplex data transferred to said peripheral board from said storage into a portion to control said peripheral board and a portion to output on said video I/O port.

12. A video peripheral board having connections for an expansion slot of a general purpose computer for providing video I/O capabilities to said general purpose host computer, said general purpose computer having a system bus, data storage accessed by read and write operations over said system bus, and a central processing unit, said system bus being controllable by said central processing unit (CPU) or by an external device connected to said system bus, the video peripheral board comprising:

a video I/O port connected to a video device;

a bus interface circuit connected to said system bus of the host computer and to said video I/O port, said bus interface circuit including a bus master address generator that generates addresses of said storage for read and write operations over said system bus, a data buffer storing video data for transfer to or from said system bus, and bus control logic that provides and receives bus control signals to and from said system bus to effect read and write operations over said system bus independent of said central processing unit of said general purpose host computer, said bus interface circuit thereby being bus master of said system bus; and a processor connected to control said video I/O port and said bus control logic of said bus interface circuit to effect transfer of video data between said video I/O port and said data buffer and transfer between said data buffer and said storage of the host computer at addresses generated by said bus master address generator, said video data passing through said video I/O port in real time, wherein said processor controls said bus master address generator to specify particular addresses in said storage so as to store said data that had been input into said video I/O port in a sequential organization into said storage in a non-sequential organization.

13. The peripheral board of claim 12 wherein said data stored in said storage in non-sequential organization are interspersed with control information related to said data.

14. The peripheral board of claim 12 wherein said data transferred from said data buffer to said storage are divided into portions, successive portions being of generally different lengths, and said generated addresses are generated in sequentially increasing order for storing data within each of said portions, said addresses being generated to leave a gap between said portions.

15. The peripheral board of claim 12 wherein said data storage is the RAM of the host computer, and said host computer manages the transfer of said data between said RAM and a mass storage device of said host computer, said processor being connected to communicate with said host's transfer management.

16. A video peripheral board having connections for an expansion slot of a general purpose computer for providing video I/O capabilities to said general purpose host computer, said general purpose computer having a system bus, data storage accessed by read and write operations over said system bus, and a central processing unit, said system bus being controllable by said central processing unit (CPU) or by an external device connected to said system bus, the video peripheral board comprising:

a video I/O port connected to a video device;

a bus interface circuit connected to said system bus of the host computer and to said video I/O port, said bus interface circuit including a bus master address generator that generates addresses of said storage for read and write operations over said system bus, a data buffer storing video data for transfer to or from said system bus, and bus control logic that provides and receives bus control signals to and from said system bus to effect read and write operations over said system bus independent of said central processing unit of said general purpose host computer, said bus interface circuit thereby being bus master of said system bus; and a processor connected to control said video I/O port and said bus control logic of said bus interface circuit to effect transfer of video data between said video I/O port and said data buffer and transfer between said data buffer and said storage of the host computer at addresses generated by said bus master address generator, said video data passing through said video I/O port in real time.

17. The video peripheral board of claim 16 wherein said processor is responsive to control commands from said CPU of the general purpose host computer to begin transfer of video data, control commands from the CPU of the general purpose host computer to stop transfer of video data, and directives from the CPU of the general purpose host computer describing addresses in said storage for transfers of data to control said bus interface circuit to transfer data between said data buffer and said storage as bus master of said system bus between said start and stop commands.

18. The video peripheral board of claim 17 wherein said storage is random access memory.

19. The video peripheral board of claim 16 further comprising an audio I/O port configured to connect a source/destination device for audio; and wherein said processor is connected to control said audio I/O port and said bus control logic to also effect transfer of audio data between said audio I/O port and said data buffer and transfer between said data buffer and said storage of the host computer at addresses generated by said bus master address generator, said audio data passing through said audio I/O port in real time.

20. The video peripheral board of claim 16 wherein said processor comprises a microprocessor.

21. The peripheral board of claim 16 wherein said storage is the RAM of the host computer, and said host computer also has a mass storage device controllable by said central processing unit of said host computer, said processor exchanging control messages with said central processing unit relating to transfers between said RAM and said mass storage device.

22. The video peripheral board of claim 16 wherein said bus control logic blocks the video data into blocks for transfer over said system bus.

23. The video peripheral board of claim 16 wherein said processor controls said bus interface circuit to effect real time transfer of data from said data storage to the video peripheral board through said bus interface circuit; and to demultiplex said data transferred to said video peripheral board into a portion to control said video peripheral board and a portion to output on said video I/O port.

24. The video peripheral board of claim 16 further comprising:

a compression/decompression coder between said video I/O port and said bus interface circuit for compressing or decompressing said video data.

25. A peripheral board having connections for an expansion slot of a general purpose computer for providing video I/O capabilities to said general purpose host computer, said general purpose computer having a system bus, data storage accessed by read and write operations over said system bus, and a central processing unit, said system bus being controllable by said central processing unit (CPU) or by an external device connected to said system bus, the video peripheral board comprising:

a video I/O port connected to a video device;

a bus interface circuit connected to said system bus of the host computer and to said video I/O port, said bus interface circuit including a bus master address generator that generates addresses of said storage for read and write operations over said system bus, a data buffer storing video data for transfer to or from said system bus, and bus control logic that provides and receives bus control signals to and from said system bus to effect read and write operations over said system bus independent of said central processing unit of said general purpose host computer, said bus interface circuit thereby being bus master of said system bus; and a processor connected to control said video I/O port and said bus control logic of said bus interface circuit to effect transfer of video data between said video I/O port and said data buffer and transfer between said data buffer and said storage of the host computer at addresses generated by said bus master address generator, said video data passing through said video I/O port in real time, further comprising a FIFO between said input port and said bus control circuit.

* * * * *

UNITED STATES PATENT AND TRADEMARK OFFICE
CERTIFICATE OF CORRECTION

PATENT NO. : 5,488,695
DATED : January 30, 1996
INVENTOR(S) : Daniel F. Cutter

It is certified that error appears in the above-indentified patent and that said Letters Patent is hereby corrected as shown below:

In the title, please delete "AS" after --EXERCISING-- and change "RELIEF" to --RELIEVE--.
Col. 5, line 21, "vis" should be --via--.
Col. 6, line 44, "25 ns" should be --25ns--.
Col. 6, line 50, "25 ns" should be --25ns--.
Col. 8, line 42, "1Count" should be --1COUNT--.
Col. 8, line 43, "1Count" should be --1COUNT--.
Col. 10, line 6, "shows" should be --show--.
Col. 10, line 9, "8c" should be --8C--.
Col. 10, line 52, "1Count" should be --1COUNT--.
Col. 10, line 54, "1Count" should be --1COUNT--.
Col. 10, line 55, "1Count" should be --1COUNT--.
Col. 10, line 55, after "value", insert --and--.
Col. 12, line 58, after "data", delete "to/".
Col. 12, line 59, before "to", delete "from/".
Col. 13, claim 1, line 57, "land" should be --and--.

Signed and Sealed this

Eighteenth Day of June, 1996

Attest:

Attesting Officer

BRUCE LEHMAN
Commissioner of Patents and Trademarks